US006615959B2

(12) United States Patent
Eroshenko (10) Patent No.: US 6,615,959 B2
(45) Date of Patent: Sep. 9, 2003

(54) DAMPER WITH HIGH DISSIPATING POWER (75) Inventor: Valentin Eroshenko, 106 rue Saint-Denis 92700, Colombes (FR)

(73) Assignees: Sarl DLD International, Paris (FR); Valentin Eroshenko, Colombes (FR)

( * ) Notice: Subject to any disclaimer, the term of this patent is extended or adjusted under 35 U.S.C. 154(b) by 0 days.

(21) Appl. No.: 10/181,264

(22) PCT Filed: Jan. 22, 2001

(86) PCT No.: PCT/FR01/00200
§ 371 (c)(1),
(2), (4) Date: Jul. 16, 2002

(87) PCT Pub. No.: WO01/55616
PCT Pub. Date: Aug. 2, 2001

(65) Prior Publication Data
US 2003/0010587 A1 Jan. 16, 2003

(30) Foreign Application Priority Data
Jan. 26, 2000 (FR) .............................. 00 00984

(51) Int. Cl.⁷ ................................................ F16F 9/30
(52) U.S. Cl. ..................................................... 188/268
(58) Field of Search ................................ 188/268, 269, 188/300, 313, 318, 319.1, 322.5

(56) References Cited

U.S. PATENT DOCUMENTS

| 4,011,929 A | * | 3/1977 | Jeram et al. ................. 188/268 |
| 4,776,436 A | * | 10/1988 | Nenkov et al. ............. 188/268 |
| 4,856,626 A | * | 8/1989 | Nakanishi .................... 188/371 |
| 5,632,206 A | * | 5/1997 | Summa et al. ........... 104/172.3 |
| 5,875,875 A | * | 3/1999 | Knotts ......................... 188/374 |
| 6,052,992 A | * | 4/2000 | Eroshenko ................... 60/509 |

* cited by examiner

Primary Examiner—Christopher P. Schwartz
Assistant Examiner—Devon Kramer
(74) Attorney, Agent, or Firm—Sughrue Mion, PLLC (57) ABSTRACT The invention relates to a shock absorber having high dissipating power and comprising a rod-and-piston assembly (12) slidably received in a cylinder (11) and defining on either side of the piston (13) respective working chambers (18; 19) containing hydraulic fluid. In the invention, each working chamber (18, 19) communicates continuously with an associated chamber (20, 21) containing a heterogeneous energy absorption-dissipation structure constituted by a capillo-porous matrix (51, 61) and an associated liquid (52, 62) relative to which the matrix is lyophobic. In addition, each working chamber (18, 19) communicates with a common compensation chamber (30) via an associated valve system (32, 33) including non-return means (40, 41) ensuring that the working chamber concerned closes automatically during compression, and opens during expansion.

26 Claims, 11 Drawing Sheets

FIG_1

FIG. 2

FIG_6

FIG_7

FIG_8

FIG_8a

FIG_8b

DAMPER WITH HIGH DISSIPATING POWER

The present invention relates to a shock absorber with high dissipating power, and more particularly to a shock absorber of the type comprising a rod-and-piston assembly sliding in a cylinder and defining on opposite sides of the piston respective working chambers containing hydraulic fluid, said rod-and-piston assembly being connected to an external source of disturbance and said cylinder being connected to a structure to be protected.

In conventional shock absorbers, a system comprising a telescopic rod and a return spring is used interposed between the structure to be protected (e.g. the bodywork of a motor vehicle) and the source of external disturbances (e.g. a wheel of the vehicle that is directly in contact with the ground). A piston rod and cylinder unit is then provided which is surrounded by the return spring and which has the function of dissipating the energy of the shocks by making use of the viscous flow of the hydraulic fluid. A relationship exists between the friction force F, the displacement speed $\dot{X}$ of the liquid, and its viscosity $\eta$ (for a Newtonian liquid): the following equation applies $F = G \cdot \eta \, (\dot{X})^n$ where G is a geometrical factor of the solid-liquid system, and $\underline{n}$ is a power term which generally lies in the range 1 to 4. Energy is dissipated in conventional shock absorbers by transforming mechanical friction energy in the solid-liquid system into heat which is given off to the outside. The amount of energy dissipated is proportional to the speed of the movement to the power $\underline{n}$, i.e. $\Delta E = K \, (\dot{X})^n$. In particular, in the event of displacement being large and at very low speed ($\dot{X} \approx 0$), then practically no energy is dissipated.

Shock absorber characteristics, as represented by variations in force as a function of displacement speed, slope to a greater or lesser extent depending on the structure of the shock absorber, and the person skilled in the art knows how to optimize comfort using conventional motor vehicle shock absorbers by lowering the characteristic of the shock absorber as much as possible. However, this leads to a paradox in that in order to have a high degree of energy dissipation and absorption, it is necessary to have a speed that is high.

Document GB-A-2 300 892 describes a shock absorber in which each working chamber is connected to compliant means, in particular an elastically deformable envelope or a gas spring, or indeed a block of closed-cell foam placed in a working chamber. In all circumstances, elastic deformation is used, so the system is reversible and energy is not dissipated.

To complete the technological background, mention can be also be made of document FR-A-85 116 which describes a suspension with variable flexibility, and document FR-A-2 478 763 which describes a hydraulic type energy dissipater.

The present invention seeks to design a novel type of shock absorber that is capable of providing a very high degree of energy dissipation and absorption, while being structurally lighter in weight and more compact than conventional shock absorbers. It is also desired that this novel type of shock absorber should be capable of operating over a relatively broad band of frequencies, given that a conventional shock absorber presents a frequency band that generally goes up to 6 Hz. If frequency values in the vicinity of 6 Hz are exceeded, then the vehicle runs the risk of flying over irregularities in the ground thus causing the wheels to lose adherence with the road.

According to the invention, this problem is resolved by a shock absorber having high dissipating power, of the type comprising a rod-and-piston assembly slidably received in a cylinder and defining on either side of the piston respective working chambers containing a hydraulic fluid, said rod-and-piston assembly being connected to an external source of disturbance and said cylinder being connected to a structure to be protected, in which:

each working chamber communicates continuously with an associated chamber containing a heterogeneous energy absorption-dissipation structure constituted by at least one capillo-porous matrix and an associated liquid relative to which said matrix is lyophobic (not wettable); and each working chamber also communicates with a common chamber via an associated valve system, said system including non-return means causing the working chamber concerned to close automatically during compression, and causing said chamber to open during expansion, said common chamber constituting a compensation chamber ensuring continuity of the hydraulic fluid during displacements of the rod-and-piston assembly in the cylinder.

The above-specified concept of a heterogeneous energy dissipating and absorbing structure using a capillo-porous matrix and an associated liquid relative to which said matrix is lyophobic is described in detail in the Applicants' document WO-A-96/18040. In that very innovative type of heterogeneous structure, a solid capillo-porous matrix is used with open pores and controlled topology, having calibrated passages with variations in section and/or interconnections so as to form labyrinths, and a liquid surrounding the capillo-porous matrix defining a solid/liquid separation surface, the matrix being lyophobic relative to the liquid. The separation surface then varies in a manner that is isothermal and reversible as a function of the external pressure to which the heterogeneous structure is subjected. It is thus possible to define genuine pairs of capillo-porous solid matrix and matching liquid that enable quite astonishing energy absorption or accumulation performance to be obtained (by quasi-reversible isothermal processes) and that enable energy to be dissipated (by irreversible isothermal processes) using only the variation in the separation surface in a manner that is quite surprising. The content of the above-specified document is consequently incorporated in the present application by reference.

Provision can be made for the hydraulic fluid occupying the working chambers to be identical to the liquid of the heterogeneous energy absorption-dissipation structures, or in a variant for each heterogeneous energy absorption-dissipation structure to be confined in a deformable leakproof housing, the hydraulic fluid occupying the working chambers then being a conventional engineering fluid.

In a particular embodiment, the rod-and-piston assembly comprises a rod which is hollow on either side of the piston, each hollow portion defining internally a chamber containing a heterogeneous energy absorption-dissipation structure enclosed in a flexible leakproof envelope.

In a variant embodiment, the rod-and-piston assembly comprises a rod which is solid on either side of the piston, and said shock absorber has chambers containing respective heterogeneous energy absorption-dissipation structures enclosed in flexible leakproof envelopes, which chambers are then placed around the cylinder, inside a common housing.

The rod-and-piston assembly of the shock absorber of the invention can be constituted by two portions having the same outside diameter, or in a variant by two portions having different outside diameters, in which case the larger diameter portion is adjacent to the structure to be protected (e.g. the bodywork of a vehicle), and the smaller diameter portion is adjacent to the external source of disturbance (e.g. the wheel of the vehicle).

Each flexible leakproof envelope can be secured to the bottom of the associated internal chamber of the rod-and-piston assembly or to the inside wall of the common housing, as appropriate, or in a variant it can be freely suspended in an associated lateral housing rigidly secured to the central housing and in communication therewith via an associated window, or indeed in said associated internal chamber.

The capillo-porous matrices can be topologically and geometrically identical on either side of the piston, or in a variant they can be topologically and geometrically different so as to impart a controlled amount of asymmetry, and in each case each matrix can be singly-porous or multiply-porous as a function of the stiffness desired for the shock absorber.

Similarly, the lyophobic liquids can have surface tension characteristics which are identical on either side of the piston, or in a variant different on either side so as to impart a controlled amount of asymmetry.

The common compensation chamber can have a flexible wall so as to present a volume that is variable. In particular, under such circumstances, provision can be made for the flexible wall to surround a central portion of the cylinder so as to define an annular chamber constituting the compensation chamber, or for the flexible-walled common compensation chamber to be arranged inside the piston which is made to be hollow, or indeed for the flexible-walled common compensation chamber to be an annular chamber provided at the end of the common housing. In a variant, provision can be made for the common compensation chamber to have a rigid wall and a bottom that is moving or deformable in association with a resilient member (e.g. a volume of gas, a diaphragm, or a piston biased by a spring).

Preferably, the valve system associated with each working chamber includes a throttle defining a calibrated orifice for passing hydraulic fluid coming from the common compensation chamber. In particular, each throttle is individually adjustable, and in particular can be set to a position such that the maximum value of the hydraulic resistance of said throttle corresponds to the value of the capillary pressure at which the liquid intrudes into the pores of the associated matrix.

In a particular embodiment, the non-return means of the valve system associated with each working chamber comprises a deformable flat collar with two branches capable of closing radial orifices of the cylinder which communicate via respective channels with the common compensation chamber.

In another particular embodiment, the non-return means of the valve system associated with each working chamber comprises moving valve members optionally biased by associated springs. In particular, the moving valve members may be arranged at the ends of a central tube opening out into the hollow piston via associated orifices, the compensation chamber containing a toroidal bellows containing air and surrounding said tube.

In which case, it is advantageous for the moving valve members to represent respective central passages constituting calibrated orifices.

Other characteristics and advantages of the invention will appear more clearly in the light of the following description and the accompanying drawings, relating to a particular embodiment and in which:

FIG. 9 is a graph showing various characteristics of a shock absorber of the invention using singly-porous matrices, as represented by the graph of associated FIG. 9a;

Figure 1:
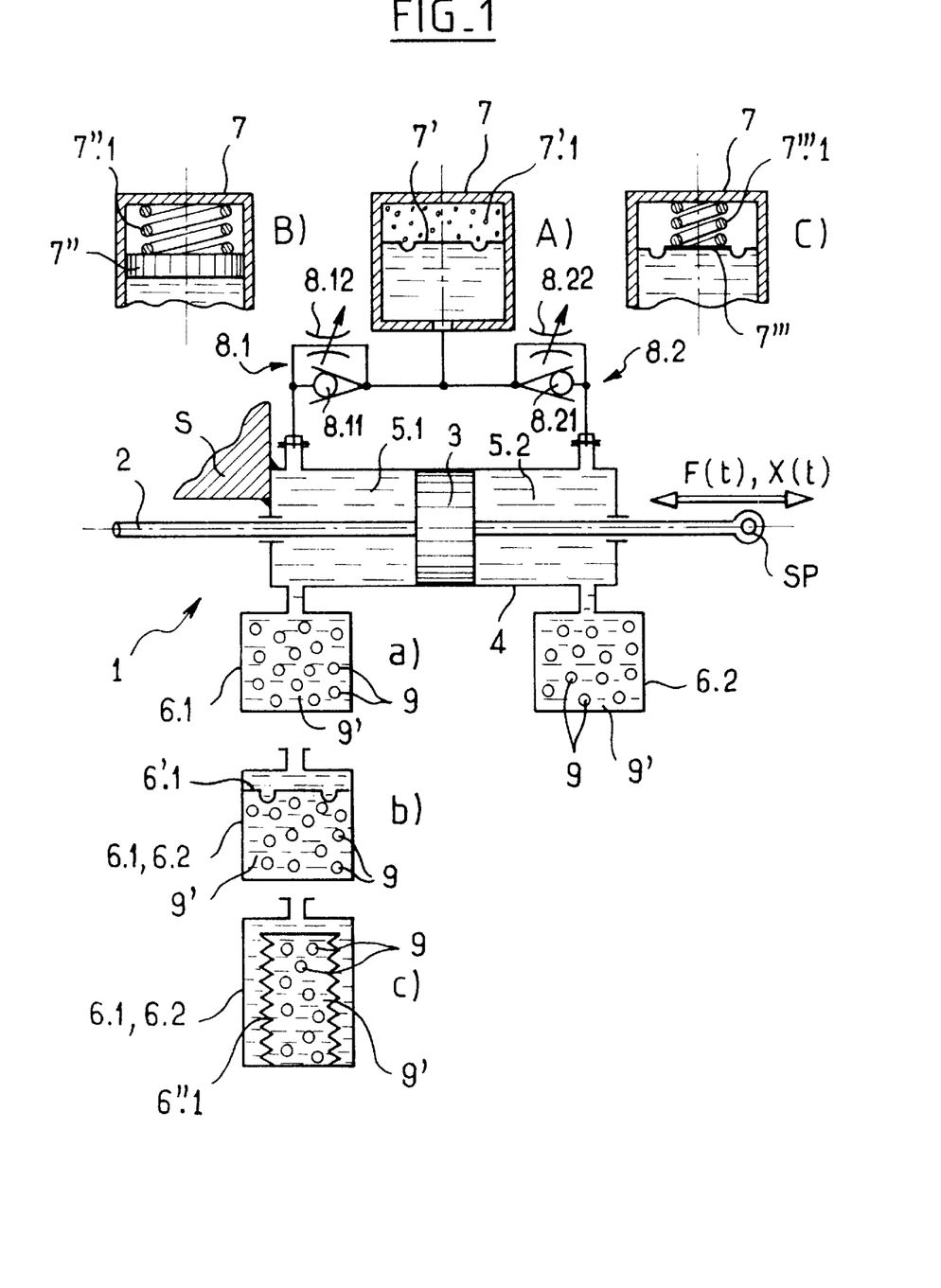
FIG. 1 is a diagrammatic view showing a shock absorber of the invention with various options for its compensation chamber [A), B), C)] and for its heterogeneous energy absorption-dissipation structure [a), b), c)]

The general structure of a shock absorber of the invention is described initially with reference to FIG. 1.

There can be seen a shock absorber referenced 1 which is of the type comprising an assembly comprising a rod 2 and a piston 3 slidably received in a cylinder 4 and defining on either side of the piston 3 respective working chambers 5.1 and 5.2 containing hydraulic fluid. The rod-and-piston assembly 2, 3 is connected to an external source of disturbance SP (e.g. a motor vehicle wheel in contact with the ground), while the cylinder 4 is connected to a structure to be protected S (e.g. the bodywork of the vehicle). The end of the rod connected to the external source SP moves axially with displacement X(t) and transmits a force F(t), where the parameter $\underline{t}$ is time.

According to a first essential characteristic of the invention, each working chamber 5.1, 5.2 is permanently in communication with an associated chamber 6.1, 6.2 containing a heterogeneous energy absorption-dissipation structure constituted by at least one capillo-porous matrix 9 and an associated liquid 9' relative to which the matrix is lyophobic (i.e. the liquid 9' does not wet the porous matrix 9). Such a pair comprising a capillo-porous matrix and an associated non-wetting liquid is described in detail together with the principle whereby said heterogeneous structure operates in above-mentioned document WO-A-96/18040.

By way of non-limiting example, the porous matrices can be made of the following materials: silicagels; aluminosilicates; all types of zeolites; porous glasses, . . . ; and the associated non-wetting liquids can be as follows: water; aqueous solutions; low temperature eutetics; polar liquids; . . . .

In the example a), the hydraulic fluid occupying the working chambers 5.1, 5.2 is identical to the liquid 9' in the heterogeneous energy absorption-dissipation structures to be found in the chambers 6.1, 6.2: in this case there is only one type of fluid.

In general, it is preferable for each heterogeneous structure 9, 9' to be confined in a deformable leakproof housing as shown in examples b) and c), with the hydraulic fluid occupying the working chambers 5.1, 5.2 then being a conventional engineering fluid such as oil. In b), the leakproof housing is defined by a diaphragm 6'.1 and in c) by a bellows envelope 6".1.

According to a second essential characteristic of the invention, each working chamber 5.1, 5.2 also communicates with a common chamber 7 via an associated valve system 8.1, 8.2. Each valve system includes non-return means 8.11, 8.21 which ensures that the corresponding working chamber 5.1, 5.2 closes automatically during compression, and opens said chamber during expansion.

The common chamber 7 constitutes a compensation chamber which ensures continuity of the hydraulic fluid contained in the working chambers 5.1, 5.2 during displacement of the rod-and-piston assembly 2, 3 in the cylinder 4.

Each valve system 8.1, 8.2 preferably also includes an adjustable throttle 8.12, 8.22 defining a calibrated through orifice.

Specifically, the common compensation chamber 7 has a rigid wall and is disposed outside the cylinder 4, but that is not essential as explained below.

The common compensation chamber 7 has a moving or deformable end wall associated with a resilient member. Three possible variants are shown here: at A) the moving end wall is a flexible diaphragm 7' and the resilient member is a volume of compressed air 7'.1; at B) the moving end wall is a piston 7" and the resilient member is a spring 7".1; and at C) the moving end wall is a flexible diaphragm 7'" having a rigid central disk, and the resilient member is a spring 7'".1.

The operation and the advantages of such a shock absorber are described below with reference to FIG. 2 which shows a complete embodiment of the shock absorber of the invention in a more structural manner.

The structure of a shock absorber of the invention is described in greater detail below with reference to FIGS. 2 to 7, for a first embodiment thereof.

Figure 2:
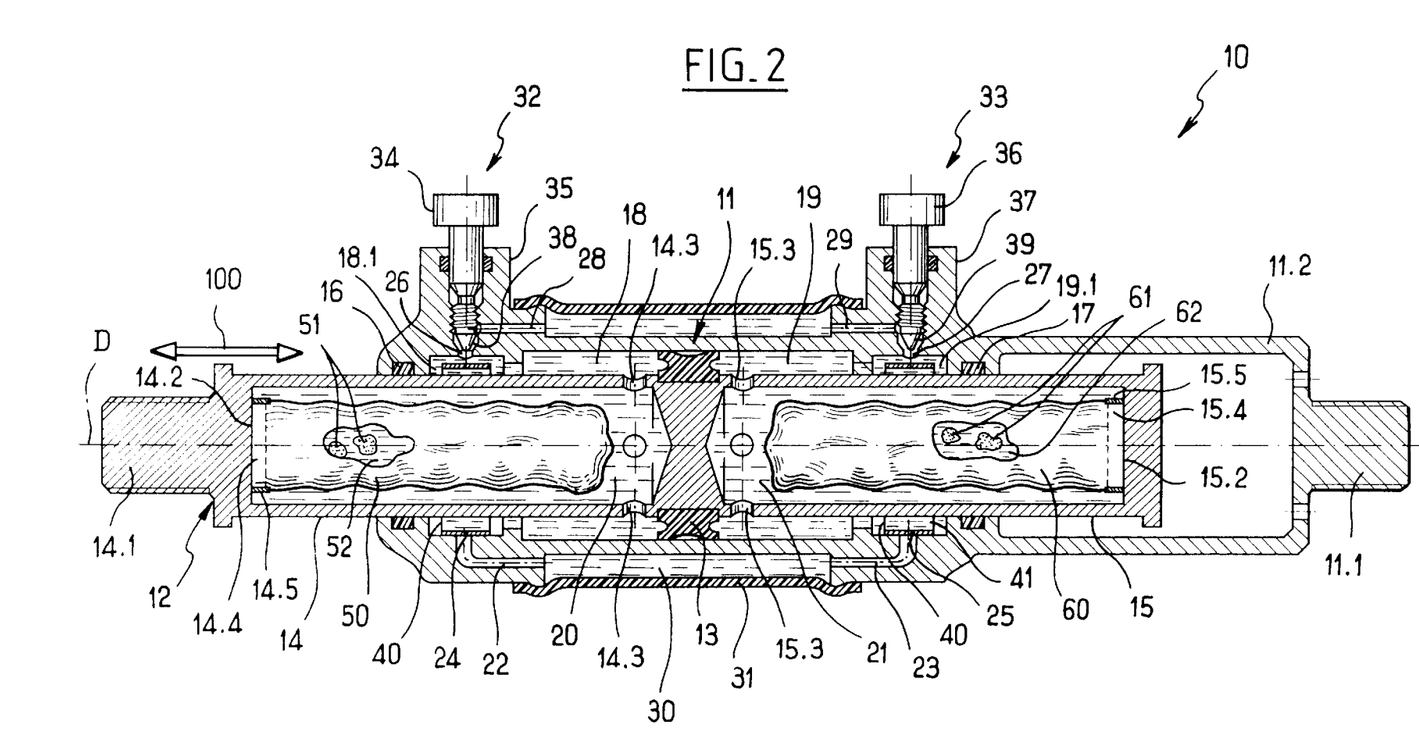
FIG. 2 is an axial section of a particular shock absorber structure of the invention.

FIG. 2 shows a shock absorber referenced 10, of the type comprising a rod-and-piston assembly 12 sliding in a cylinder 11 and defining respective working chambers 18, 19 on opposite sides of the piston 13, which chambers are in permanent communication with associated internal chambers 20, 21 inside the rod-and-piston assembly 12.

Specifically, the rod-and-piston assembly 12 is constituted by two hollow portions 14 and 15 having the same outside diameter, extending on opposite sides of the piston 13, sealing is provided by associated O-rings 16, 17. The rod-and-piston assembly 12 then slides in an axial direction 100 inside the cylinder 11 on an axis D, the end 14.1 of the rod-and-piston assembly being connected to an-external source of disturbance (not shown here). When mounted on a motor vehicle, this portion 14.1 is preferably associated with the wheel of the vehicle, and the opposite portion 11.1 of the cylinder 11 having an extension forming a protective cap 11.2 at its end is associated with the structure to be protected, e.g. the bodywork of said vehicle.

As explained below for the variants shown in FIGS. 17 to 23, provision can be made for the rod-and-piston assembly 12 to be constituted by two portions that are of different outside diameters, in which case it is advantageous to provide for the larger diameter portion to be disposed adjacent to the structure to be protected and the smaller diameter portion adjacent to the external source of disturbance so as to absorb shock with minimum force (improving passenger comfort in the vehicle), and so as to exert a rebound with a greater force (improving wheel adherence on the road).

It can be seen that each internal chamber 20, 21 of the rod-and-piston assembly 12 communicates via associated orifices 14.3, 15.3 with the associated working chamber 18, 19 which corresponds in this case to the annular space defined between the body of the cylinder 11 and the outside surface of the rod-and-piston assembly 12.

According to the above-mentioned first essential characteristic of the invention, each internal chamber 20, 21 of the rod-and-piston assembly 12 contains a flexible leakproof envelope 50, 60 itself containing a heterogeneous energy absorption-dissipation structure constituted by a capillo-porous matrix 51, 61 and an associated liquid 52, 62 relative to which said matrix is lyophobic. As mentioned above, such a pair comprising a capillo-porous matrix and an associated non-wetting liquid is described in detail together with the principle whereby the heterogeneous structure operates in the above-mentioned documents WO-A-96/18040. It should be observed that the liquid 52, 62 contained in leakproof manner in the associated envelope 50, 60 has nothing to do in this case with the hydraulic fluid that occupies the internal chambers 20 and 21 of the rod-and-piston assembly 12 and the associated working chambers 18, 19, which hydraulic fluid is a conventional engineering fluid such as oil.

In this case, each flexible leakproof envelope 50, 60 is secured to the end wall 14.2, 15.2 of the associated internal chamber 20, 21 of the rod-and-piston assembly 12. Collars 14.4 and 15.4 are shown diagrammatically projecting from the end wall 14.2, 15.2 of the rod-and-piston assembly 12, which collars are connected to the open ends of the associated flexible envelopes, fastening being achieved by means of clamping collars 14.5, 15.5.

Although not shown herein, in a variant, it would be possible to provide for each flexible leakproof envelope 50, 60 to be freely suspended inside the associated internal chamber 20, 21 of the rod-and-piston assembly 12.

The capillo-porous matrices 51, 61 contained within their flexible leakproof envelopes 50, 60 are generally topologically and geometrically identical on either side of the piston 13. Nevertheless, it would be possible in a variant to provide for the capillo-porous matrices 51, 61 to be topologically and geometrically different on opposite sides of the piston 13, thereby deliberately imparting a predetermined amount of asymmetry. In this case, for example, if different geometries are selected (different radii for the pores and the capillaries), then the matrix having the smaller radius pores and capillaries is placed in the chamber that is associated with rebound (so as to have a high force on this side of the piston), while the matrix having the pores and capillaries of larger radius is placed in the chamber which is associated with shock. Naturally, it would also be possible to modify the topology of the pore space in the two matrices.

In order to obtain such a predetermined amount of asymmetry, it is possible in a variant to use capillo-porous matrices that are essentially identical (topologically and geometrically) on either side of the piston 13, but to have these matrices immersed in liquids that present different surface tension characteristics on either side of said piston. Under such circumstances, the liquid having the higher surface tension is placed in the chamber associated with rebound (in order to have a higher force on this side of the piston), and the liquid with lower surface tension is placed in the chamber which is associated with shock.

In both cases, each capillo-porous matrix 51, 61 can be singly-porous or multiply-porous depending on whether the distribution factor for pores of radius $r$ within the volume V of the matrix is zero or non-zero, respectively. This factor can be written $\partial r/\partial V$ where $\partial r/\partial V=0$ for a singly-porous matrix and $\partial r/\partial V \neq 0$ for a multiply-porous matrix. These structural features of capillo-porous matrices are described in detail in the above-mentioned document WO-A-96/18040.

It is known that with such heterogeneous structures, the liquid surrounding the capillo-porous matrices penetrates into the pores of said matrices only when the surrounding liquid pressure exceeds the so-called Laplace pressure, which capillary pressure is given by the formula $P=(2\sigma \cdot |\cos\theta|)/r$ where $\sigma$ is the surface tension of the liquid used, $\theta$ is the solid-liquid angle of contact (in this case much greater than 90°), and $r$ is the radius of the capillary pores in the porous matrix ($r$ in this case lies between the radius of the molecules of the non-wetted liquid used, and a value of about one-tenth of a micrometer). It is this fundamental formula which governs the pressure that prevails in the heterogeneous system, i.e. inside each leakproof flexible envelope 50, 60.

The combined use of capillarity phenomena and Pascal's law for hydraulic systems (pressure is identical at all points within a closed space) ensures that the pressure inside the envelope 50, 60 is identical to the pressure inside the chambers 18, 20 and 19, 21, respectively. Furthermore, in order to enable the shock absorber to operate, the volume of liquid in the envelopes 50, 60 must be not less than the sum of the volumes of the pores in the corresponding matrix plus the volumes between the porous particles of said matrix.

According to the above-mentioned second essential characteristic of the invention, each working chamber 18, 19 also communicates with a common chamber via an associated valve system, said system including non-return means for closing the corresponding working chamber during compression, and opening said chamber during expansion. This common chamber constitutes a compensation chamber that ensures continuity for the hydraulic fluid during displacements of the rod-and-piston assembly 12 in the cylinder 11.

In this case, the common compensation chamber referenced 30 has a flexible wall (wall 31) so as to be variable in volume. The flexible wall 31 surrounds a central portion of the cylinder 11 so as to define an annular chamber constituting the compensation chamber 30. The connections between the compensation chamber 30 and the working chambers 18, 19 take place via respective channels 28, 29 leading to the associated valve systems 32, 33, and respective pluralities of channels 22, 23 (six channels in each case) connecting with a terminal compartment 18.1 or 19.1 of the working chamber 18, 19.

As mentioned above, it is possible in a variant to provide a common compensation chamber having a rigid wall, in which case it would be outside the shock absorber, and connected to the working chambers 18, 19 via associated pipes, the common compensation chamber then presenting a moving or deformable end wall associated with a resilient member. Under such circumstances, the common compensation chamber having a rigid wall communicates with each working chamber 18, 19 via a respective valve system identical to that described below.

In practice, it is preferable for the compensation chamber to have a flexible wall if the system is to remain in a low frequency range (return flows are driven by the difference between atmospheric pressure and the suction in the working chambers during expansion), and a rigid wall if the system remains in a high frequency range.

Figures 3, 4:
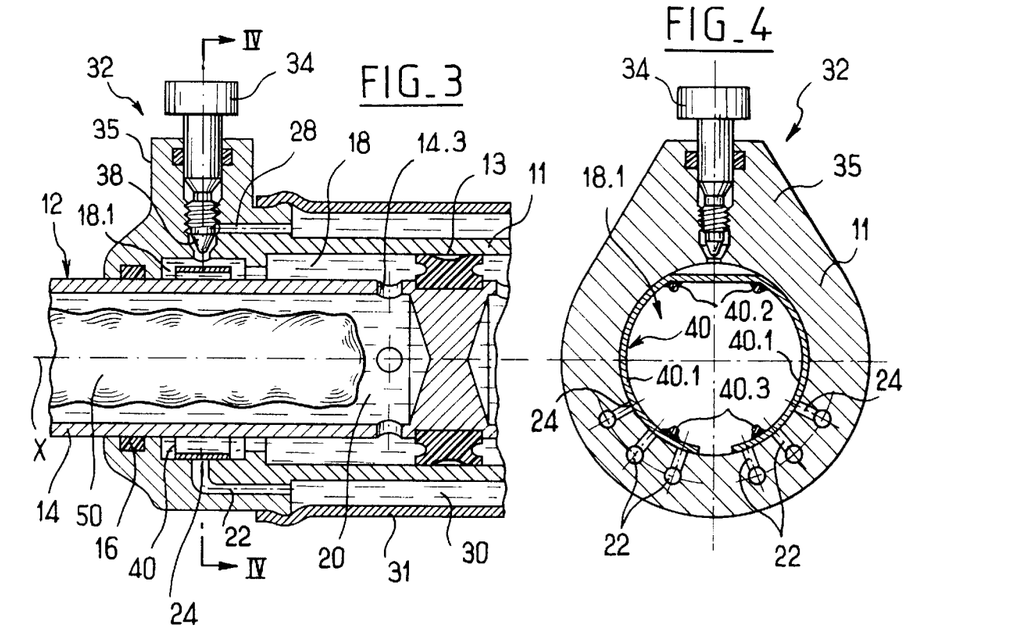
FIG. 3 is a fragmentary section on a larger scale of the above shock absorber.
FIG. 4 is a section associated with line IV—IV in FIG. 3.

As shown in FIGS. 2 and 3, the valve system 32, 33 associated with each internal chamber 20, 21 of the rod-and-piston assembly 12 includes a throttle 34, 36 defining a calibrated orifice 26, 27 for passing the hydraulic fluid coming from the common compensation chamber 30 via the link channels 28, 29. Specifically, each throttle 34, 36 is mounted on an associated projection 35, 37 from the cylinder body 11. The distal end of each throttle 34, 36 has a conical endpiece 38, 39 co-operating with a calibrated orifice 26, 27 to define a predetermined width. Preferably, as shown herein, each throttle 34, 36 is individually adjustable from the outside, which can be achieved in this case by tightening or loosening a threaded portion of the throttle in a bore associated with the projection 35, 37. This makes it easy to achieve any particular adjustment for the shock absorber as a function of the conditions encountered, as described in greater detail below. In particular, arrangements can be made for the position of each throttle 34, 36 to be set to a value such that the maximum value of the hydraulic resistance of said throttle corresponds to the capillary pressure value at which the liquid 52, 62 intrudes into the pores of the associated matrix 51, 61 (Laplace capillary pressure).

The valve system 32, 33 associated with each internal chamber 20, 21 also has non-return means implemented in this case in the form of a deformable flat collar 40, 41 disposed in the associated terminal compartment 18.1, 19.1.

As can be seen more clearly in FIGS. 4 to 7, each deformable flat collar 40, 41 has two branches that can close radial orifices 24, 25 of the cylinder 11 communicating via the six respective channels 22, 23 with the common compensation chamber 30.

FIGS. 4 to 7 show more clearly how the flat collar 40 associated with the working chamber 18 is implemented, but it should be understood that the other collar 41 which is associated with the other working chamber 19 is identical in structure.

Figure 6:
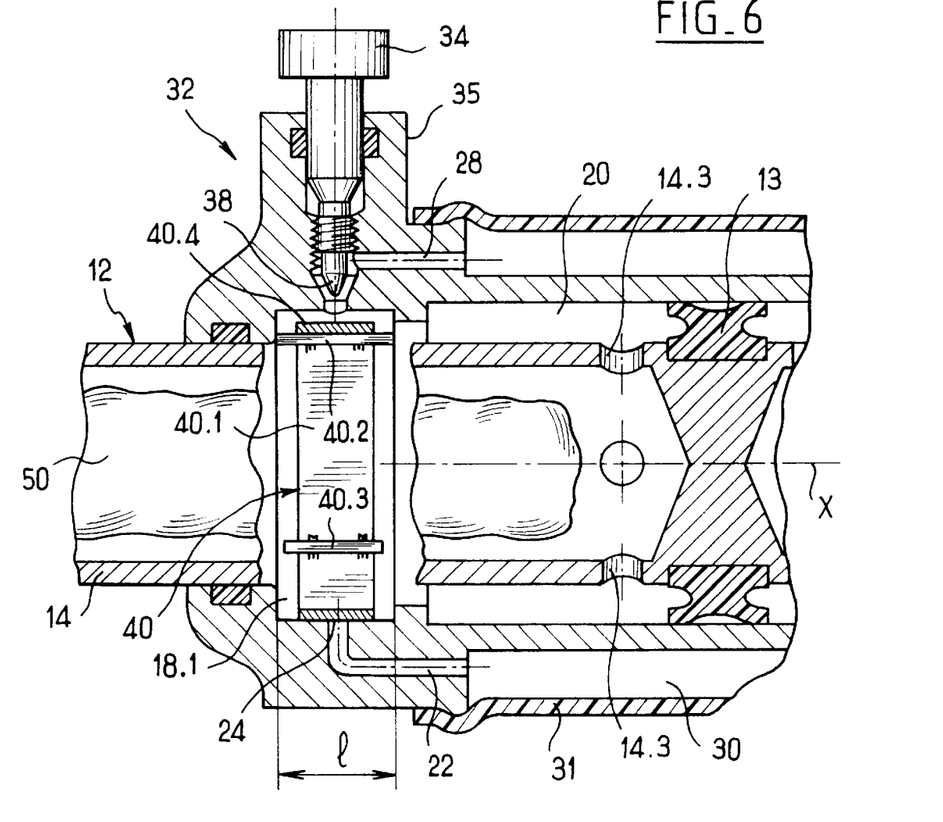
FIG. 6 is a fragmentary section view of the above shock absorber with the rod-and-piston assembly and the flexible leakproof envelope containing a heterogeneous energy absorption-dissipation structure being cut away so as to show more clearly how the non-return means forming a part of the associated valve system are arranged.
Figure 7:
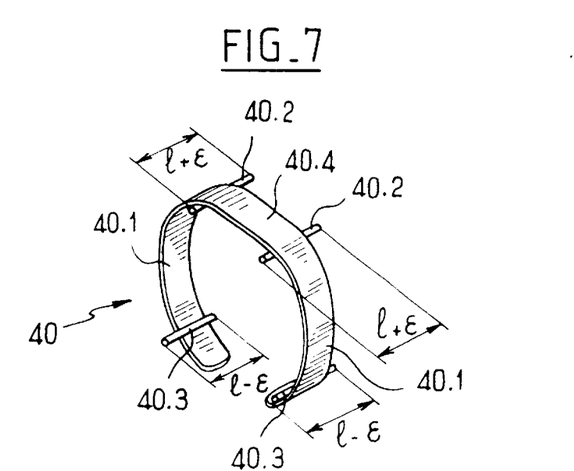
FIG. 7 is a perspective view showing the structure of the above non-return means.

The collar 40 (FIGS. 4 to 7) is made of beryllium bronze, for example, thus presenting two flat branches 40.1 extending from a stationary top portion 40.4 (FIG. 7). Fingers 40.2 and 40.3 are bonded thereto to hold the deformable collar 40 in position in the associated housing 18.1. In FIGS. 6 and 7, the width of compartment 18.1 is referenced l. The fingers 40.2 associated with the stationary portion 40.4 of the collar 40 are slightly longer than l, referenced herein as l+$\epsilon$ so as to hold the collar 40 in place by wedging. In contrast, the other fingers 40.3 are slightly shorter, written l−$\epsilon$, so as to leave the branches 40.1 of the collar 40 free to move transversely inside the compartments 18.1 and 19.1. It will readily be understood that the branches 40.1 are naturally pressed by the resilience of the collar 40 against the orifices 24 of the channels 22, thereby closing said channels. However, if hydraulic fluid coming from the compensation chamber 30 arrives via the channels 22, this fluid can exert sufficient thrust to move the branches 40.1 of the collar 40 towards each other thus allowing the fluid to pass through the orifices 24.

Figure 5:
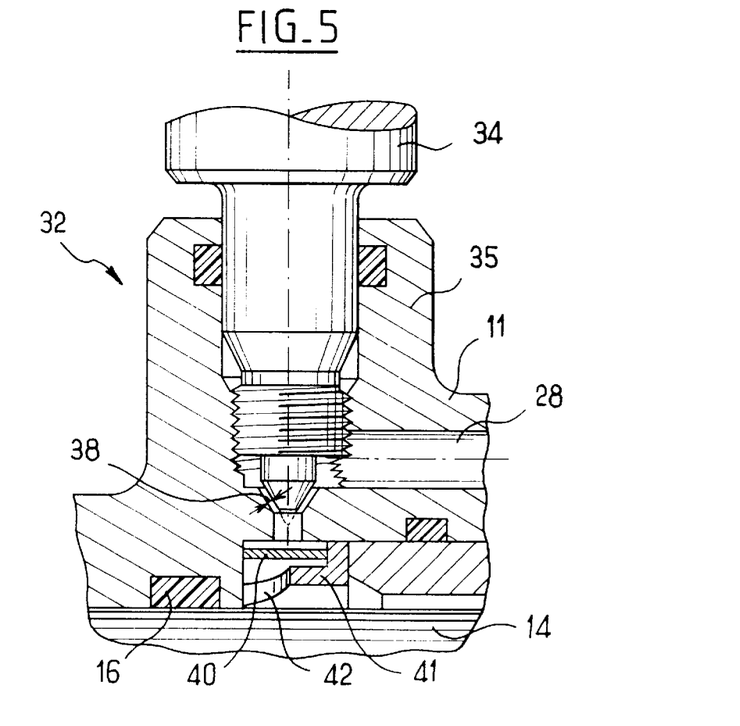
FIG. 5 is a detail view in section on a larger scale showing more clearly the structure of the valve system associated with each working chamber of the shock absorber.

In the detail of FIG. 5, there can be seen a washer 41 having orifices 42 serving both to hold the collar 40 in position and to allow the fluid arriving via the calibrated orifice 38 to pass through. This constitutes a variant embodiment having the advantage of simplifying manufacture of the flat collar, and in particular of avoiding the need to bond the holding fingers thereto.

The operation and the characteristics of the shock absorber of the invention made structurally as described above with reference to FIG. 2 are described below in greater detail with reference to FIGS. 8 to 16.

Initially the situation of the shock absorber at rest is examined, i.e. when it is not subjected to any external stress. The rod-and-piston assembly 12 (FIG. 2) is then in mutual equilibrium, with said rod-and-piston assembly being located, for example, in the middle of the cylinder 11 due to action from an external return spring (not shown), it being understood that the assembly can be stopped in an arbitrary position. The pressures in the two working chambers 18, 19 and also in the compensation chamber 30 are then all equal. The pore spaces in the matrices of the heterogeneous structures enclosed in the envelopes are then empty, with this being the result of the fact that the associated liquid cannot spontaneously penetrate into the capillary pores of the matrices because they are not wettable by said liquid (angle $\theta$ considerably greater than 90°). Thus, even in the absence of a return spring, a certain amount of force must be applied to the rod-and-piston assembly in order to move the piston. This means that in equilibrium the position of the piston is automatically determined, such that self-stabilization is obtained that is most advantageous in practice since it prevents the system being rigid.

If the shock is now exerted on the free end of the rod-and-piston assembly 12, tending to displace the assembly to the right in FIG. 2, the throttle 36 behaves as a plug and prevents the hydraulic fluid in the working chamber 19 from going towards the compensation chamber 30, and the check valve 41 is closed so that the chambers 19 and 21 form a closed receptacle. The quasi-condensed fluid compresses the flexible envelope 60 and the pressure inside said envelope increases from the value of atmospheric pressure, such that once the pressure exceeds the value of the Laplace capillary pressure, the volume inside the envelope 60 is decreased as the working liquid 62 penetrates into the pores of the associated porous matrices 61. In parallel with the increase in pressure (compression) in the chambers 19 and 21, there is a decrease in pressure (expansion) in the other chambers 18 and 20. The presence of the check valve 40 and of the compensation chamber 30 serves to prevent a vacuum appearing in the chambers 18 and 20, thus ensuring that the condensed phase remains continuous.

Because of the two throttles 34, 36 which are adjustable, it is possible to set the determined hydraulic resistance that needs to be overcome by liquid being driven between the chambers 18, 20 and 19, 21 through the compensation chamber 30. In this case, the pressure to be overcome is the capillary pressure at which the lyophobic liquid intrudes into the associated matrices (the Laplace capillary pressure).

Returning now to the piston moving to the left in a dynamic state, it can be seen that the volume of the heterogeneous system in the compression chamber 18 diminishes under the action of the forced compression pressure (due to external action). Simultaneously with this phenomenon in the chambers 18 and 20, the hydraulic fluid is delivered from the compensation chamber 30 to the chamber 19, 21 via the check valve 41 so as to ensure that the condensed phase remains continuous in the space provided by the chambers 19, 21. If the rod-and-piston assembly stops at some moment and thereafter is urged to begin to move in the opposite direction, then forced compression occurs instantaneously in the chamber 19, 21 because of the hydraulic resistance of the throttle 36, and the liquid intrudes into the capillary pores of the heterogeneous system contained in the envelope 60, while simultaneous expansion occurs in the chambers 18 and 20 with the liquid being expelled spontaneously from the capillary pores of the heterogeneous system contained in the envelope 50. During this expansion of the heterogeneous system, the volume of the envelope 50 increases, occupying the space of the chamber 20. If at this moment there is a deficit in the volume of condensed fluid in the chamber 18, 20, the fluid in the compensation chamber 30 will penetrate via the check valve 40 into the space of the working chambers 18 and 20 under drive from the pressure difference (atmospheric pressure acting on the flexible wall 31 plus possible suction in the internal chamber 20) as the rod-and-piston assembly moves to the right.

In other words, independently of the position and of the travel direction of the piston 13 (FIG. 2), the heterogeneous system is ready at all times to absorb the energy of the external shock or the rebound energy in the corresponding working chamber so as to dissipate it in the opposite working chamber. The compensation chamber 30 is fundamental since it serves to provide hydraulic fluid continuity in the system, preventing any rupture that could arise either from the compression/expansion speed or from geometrical asymmetry as might result, for example, from a difference in the diameters of the two portions of the hollow rod 12.

Figure 8:
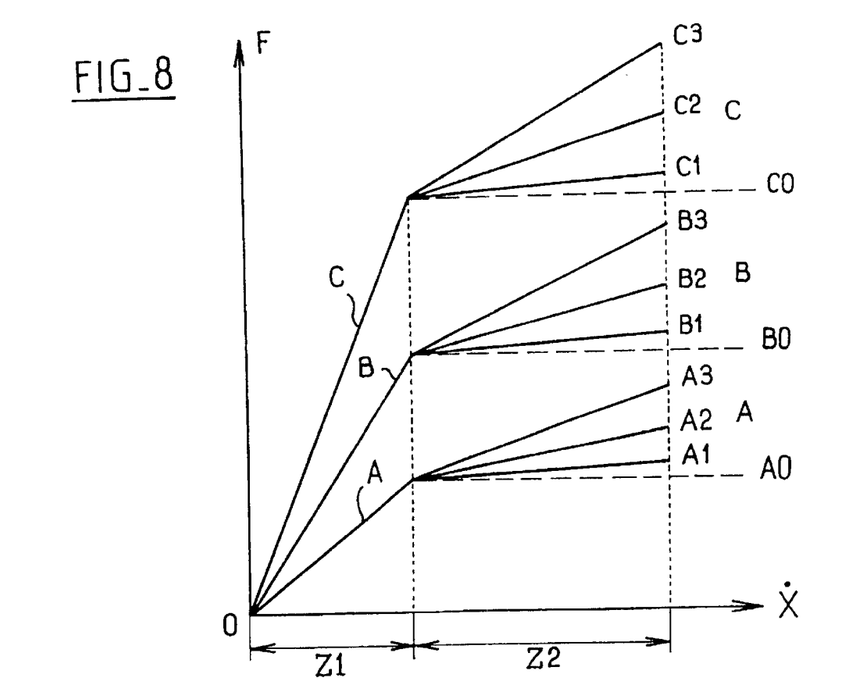
FIG. 8 is a graph showing various characteristics of a shock absorber of the invention using multiply-porous matrices, the various curves resulting both from the throttling system being opened to different extents as shown in FIG. 8a and from various different matrix structures as shown in FIG. 8b, which are curves showing the pore size distributions of the matrices.
Figure 8A:
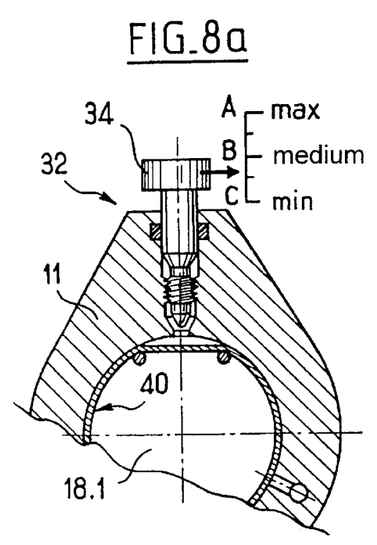
Figure 8B:
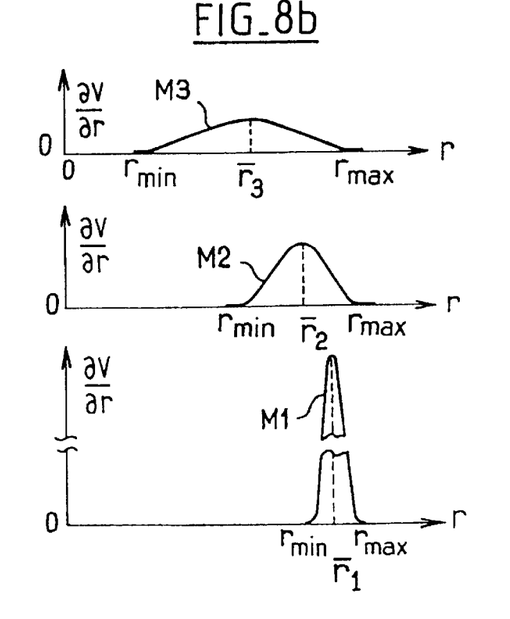

With reference now to the graph of FIG. 8, which corresponds to multiply-porous matrices, it can be seen that variations in force F as a function of displacement speed k have a first speed zone Z1 which could be referred to as being "Newtonian", followed by a second zone Z2 which corresponds more particularly to the operation of the corresponding lyophobic heterogeneous system. The various linear portions referenced A, B, and C in the zone Z1 correspond, in fact, to the throttle 34 being opened to different degrees, as represented diagrammatically in FIG. 8a, having a maximum value A, a medium value B, and a minimum value C. For the zone Z2, the characteristics are of different slopes as a function of the geometry and shape of the multiply-porous matrix. With reference to FIG. 8b which shows three pore size distribution curves (in terms of radius r) for the matrices in the volume V, it can be said that the segments A1, B1, C1 correspond to a relatively sharp distribution curve of the type M1, while the curves A2, B2, C2 correspond to a medium distribution of the type M2, and the curves A3, B3, C3 correspond to a flatter distribution M3. The segments A3, B3, C3 correspond to the shock absorber being on a hard setting, while the segments A2, B2, C2 correspond to a medium setting and the segments A1, B1, C1 correspond to a comfortable setting. The horizontal segments A0, B0, C0 correspond to an ideal setting, of a kind that is never achieved in practice.

Under such circumstances, use is made both of adjustments to the throttle and of a suitable choice for the geometry/morphology of the porous matrices in the heterogeneous structure for the purpose of adjusting the characteristics of the shock absorber as a function of the conditions encountered. The liquid with respect to which the porous matrices are lyophobic remains essentially invariable (FIG. 8).

Figure 9:
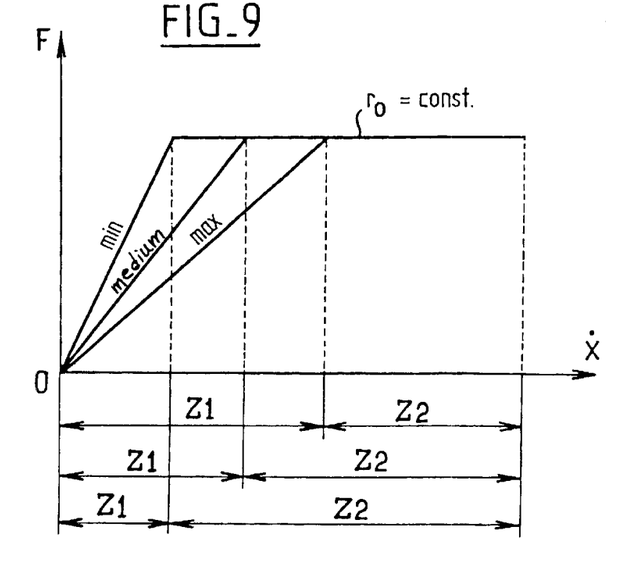
Figure 9A:
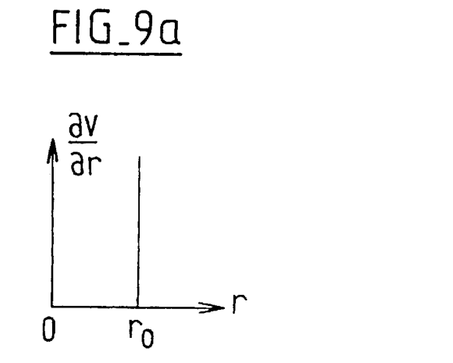

The graph of FIG. 9 shows behavior with a singly-porous matrix ($r_0$=constant). Adjustments to the throttle then define a first portion of the characteristic that slopes at a different angle depending on how open the throttle is (max, medium, min) together with a corresponding extent for the "Newtonian" zone Z1. Thereafter the force F is practically constant, i.e. it does not depend significantly on speed $\dot{X}$. This illustrates a quite remarkable feature of the shock absorber of the invention setting it well apart from conventional shock absorbers which have a characteristic where force is proportional to displacement speed to a power of at least 1. FIG. 9a is a simple diagram showing the distribution of pore sizes in the volume V, it being recalled that this is a singly-porous matrix, i.e. it has a pore radius r set on the value $r_0$ (e.g. a molecular sieve, zeolites, . . . ).

Figure 10:
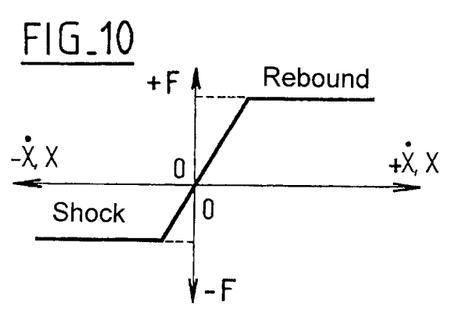
FIGS. 10 and 11 show the characteristics of a shock absorber of the invention for the shock and the rebound portions thereof.
Figure 11:
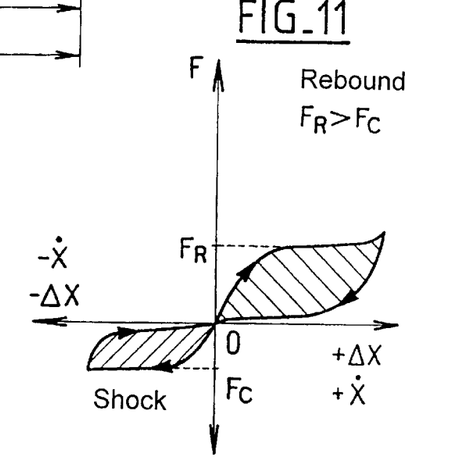

The diagrams of FIGS. 10 and 11 show characteristics comprising both rebound and shock as obtained with a shock absorber of the invention, with a force that is constant as from when the heterogeneous structures start to work, respectively with singly-porous matrices and with multiply-porous matrices.

Figure 12:
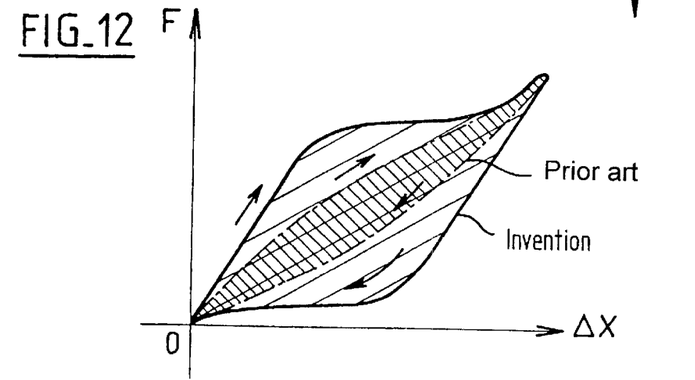
FIG. 12 is a diagram showing both the static characteristic of the shock absorber of the invention and that of a conventional shock absorber, said diagram revealing the high energy absorption power of the shock absorber of the invention compared with conventional systems.

The diagram of FIG. 12 shows both the behavior of a shock absorber of the invention (solid line curve plotting force F as a function of displacement $\Delta X$) and the behavior of a conventional shock absorber (chain-dotted line). With conventional shock absorbers, having characteristics in which F is proportional to $\dot{X}$, the displacement $\Delta X$ can be represented in FIG. 12 as being $\Delta X = \dot{X} \cdot \Delta t$ (where $\Delta t$ is a unit time interval). It can be seen that the shaded zone associated with conventional shock absorbers corresponds to much less dissipation of energy than that associated with a shock absorber of the invention. If the ratio of energy dissipated over working chamber volume is calculated, which ratio corresponds to capacity for dissipation, it can be seen that the shock absorber of the invention makes it possible to obtain a capacity for dissipation that is 100 to 1000 times greater. Performance is thus obtained which is quite remarkable in terms of the amount of energy dissipated while using a very small volume of working liquid.

Figure 13:
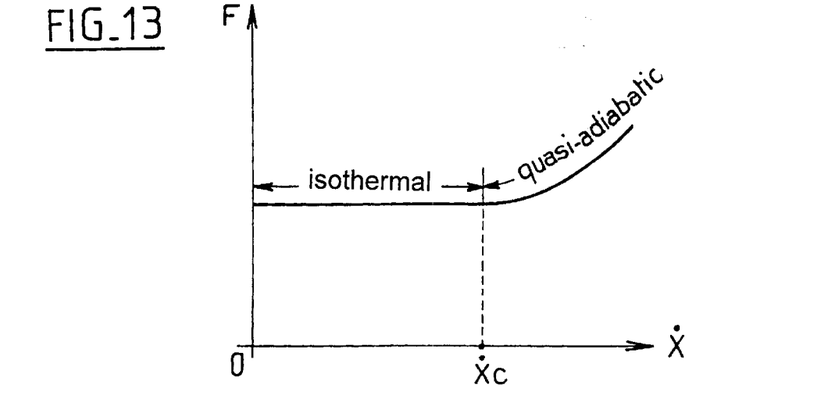
FIG. 13 is a diagram showing another feature of the shock absorber of the invention, in which the force F does not vary with displacement speed below a critical speed.

The plot of FIG. 13 (force F as a function of displacement speed $\dot{X}$) shows that the force F does not vary with displacement speed so long as the speed remains below a critical speed $\dot{X}_c$ (isothermal conditions for the compression/expansion cycle of the lyophobic heterogeneous structure). Above the critical $\dot{X}_c$, the force F increases with speed $\dot{X}$: this can be explained by the deficit of heat flux coming from the outside to the compression chamber relative to the heat flux necessary for isothermal formation of the matrix/liquid interface which is normally endothermic. When $\dot{X} > \dot{X}_c$, the process approximates a process that is quasi-adiabatic, thereby reducing the temperature of the heterogeneous system and increasing surface tension (and thus the Laplace capillary pressure). The Laplace pressure determines the force F which therefore increases on the plot of FIG. 13.

Figure 14:
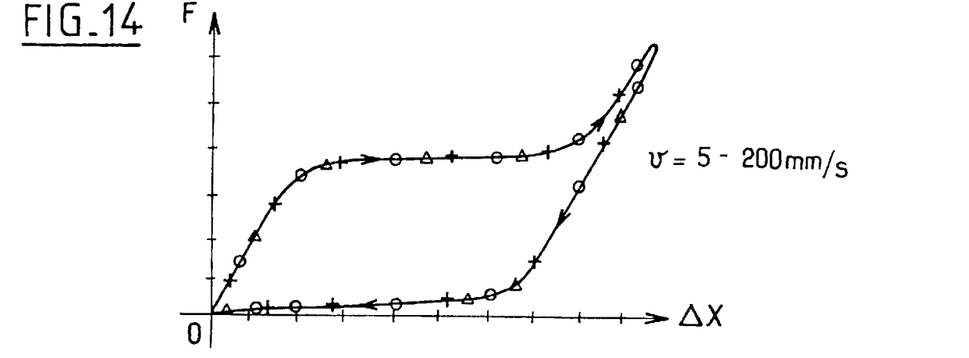
FIG. 14 shows the characteristic of the shock absorber of the invention built up point by point at different speeds (in the range 5 millimeters per second (mm/s) to 200 mm/s.

The plot of FIG. 14 (force F as a function of absolute displacement $\Delta X$) needs to be compared with that of FIG. 12, and is built up point by point for different displacement speeds $\dot{X}$ in the range 5 mm/s to 200 mm/s), with the points all remaining on the same curve regardless of speed (providing it is below the above-mentioned critical speed).

Figure 15:
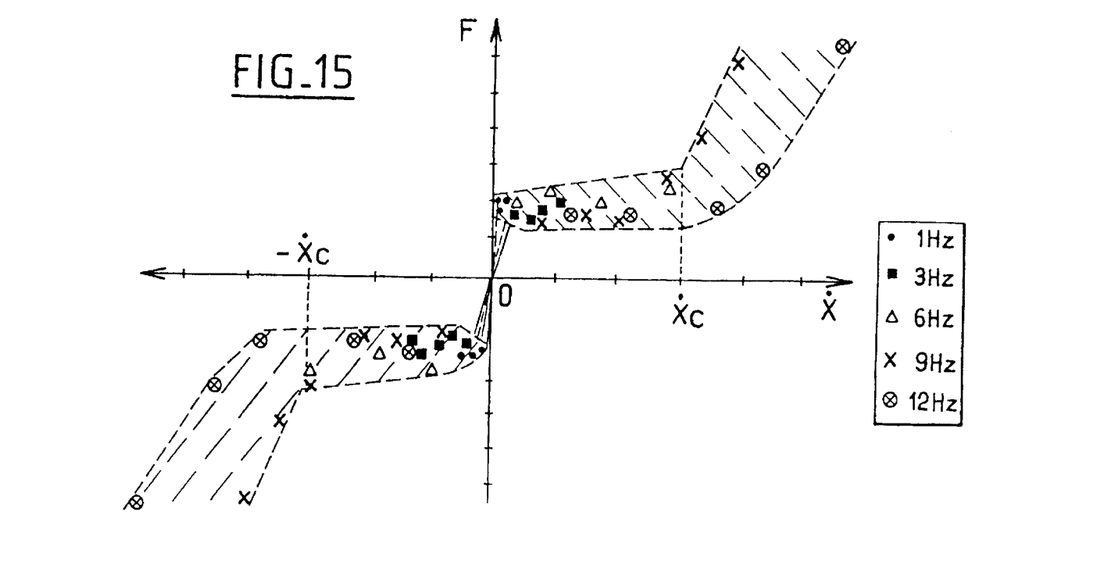
FIG. 15 is another characteristic diagram obtained by varying frequency over the range 1 Hz to 12 Hz, said diagram showing that force F is independent of frequency below the critical speed.

The plot of FIG. 15 (force F as a function of displacement $\dot{X}$) shows values measured at different frequencies (1 Hz, 3 Hz, 6 Hz, 9 Hz, and 12 Hz): it can be seen that the force F is independent of frequency below the critical speed $\dot{X}_c$.

Figure 16:
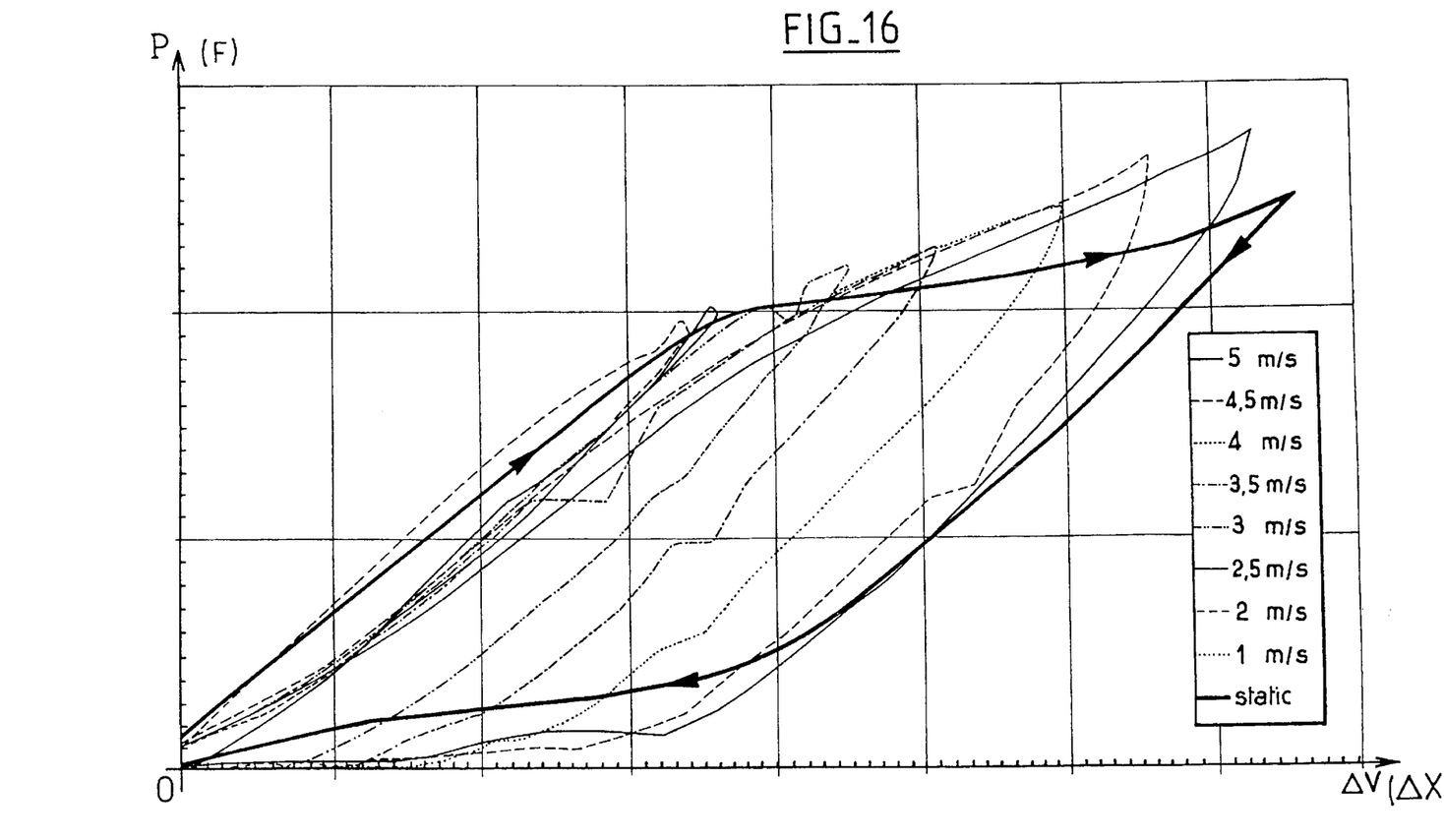
FIG. 16 is a diagram showing the characteristics of a liquid and lyophobic matrix pair at different speeds for the shock absorber rod, including zero speed (0 to 5 meters per second (m/s)), said diagram showing that the pressure P (or the force F) is independent of speed (where the speeds in question are below the critical speed)

The plot of FIG. 16 (pressure P as a function of variation in volume $\Delta V$, or indeed force F as a function of displacement $\Delta X$) shows a plurality of characteristics measured at different speeds for the rod of the shock absorber, including zero speed (0 m/s or static, 1 m/s, 2 m/s, 2.5 m/s, 3 m/s, 3.5 m/s, 4 m/s, 4.5 m/s, and 5 m/s). It can be seen that the pressure P (or the force F) is practically independent of speed (the speeds in question all being lower than the critical speed), such that the dynamic characteristic remains, in practice, practically identical to the static characteristic. It can be seen that variation in pressure varies by only a few percent even though the variation in speed between 0 and 5 m/s is proportionally very large.

It is clear that the characteristics of the shock absorber of the invention as shown on the above plots are quite unlike those of conventional shock absorbers.

Other structural variants of the shock absorber as described above are described briefly below with reference to FIGS. 17 to 23.

Figure 17:
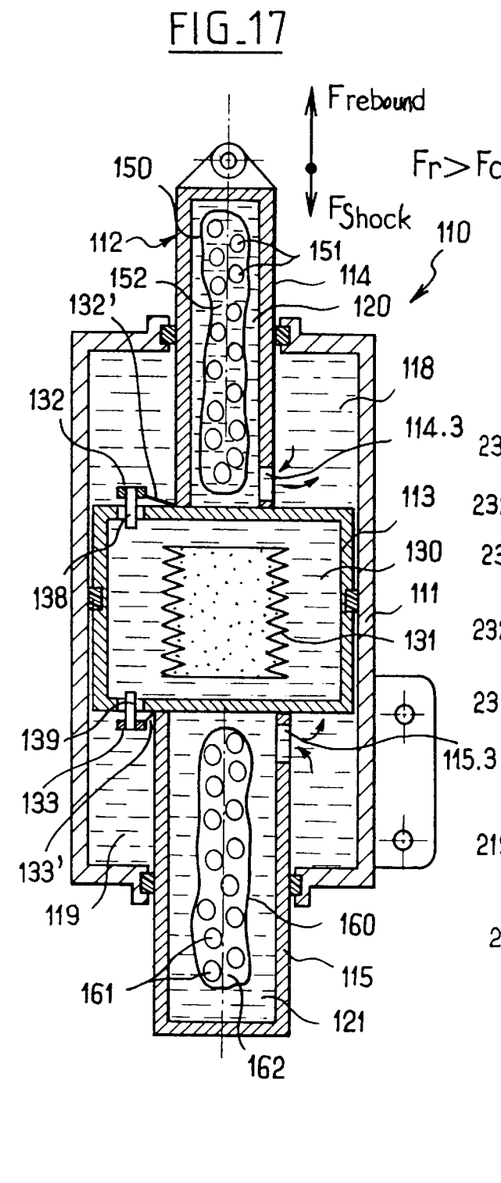
FIGS. 17 and 18 are sections through two other variant embodiments of a shock absorber of the invention, with a rod-and-piston assembly in which the rod and the piston are hollow.

In FIG. 17, corresponding members are given the same references as before plus 100.

The structure of FIG. 17 differs from that of FIG. 2 in that each flexible leakproof envelope 150, 160 is freely suspended in the associated internal chamber 120, 121 of the rod-and-piston assembly 112, and above all by the fact that the common compensation chamber 130 having a flexible wall 131 (a bellows of metal or of plastics material containing air) is arranged inside the piston 113 which is made hollow for this purpose. The compression chambers 118, 119 communicate with the space surrounding the envelopes 150, 160 via windows 114.3, 115.3. Equal pressure hydraulic communication in the static state is provided on either side of the piston by moving valve members 132, 133 biased by respective blade springs 132', 133', each valve member also having a central orifice 138, 139 forming a constant calibrated orifice (i.e. not adjustable in this case). Since the portions 114, 115 of the hollow rod are of different diameters, the rebound force is greater than the shock force (written $F_r > F_{ch}$).

Figure 18:
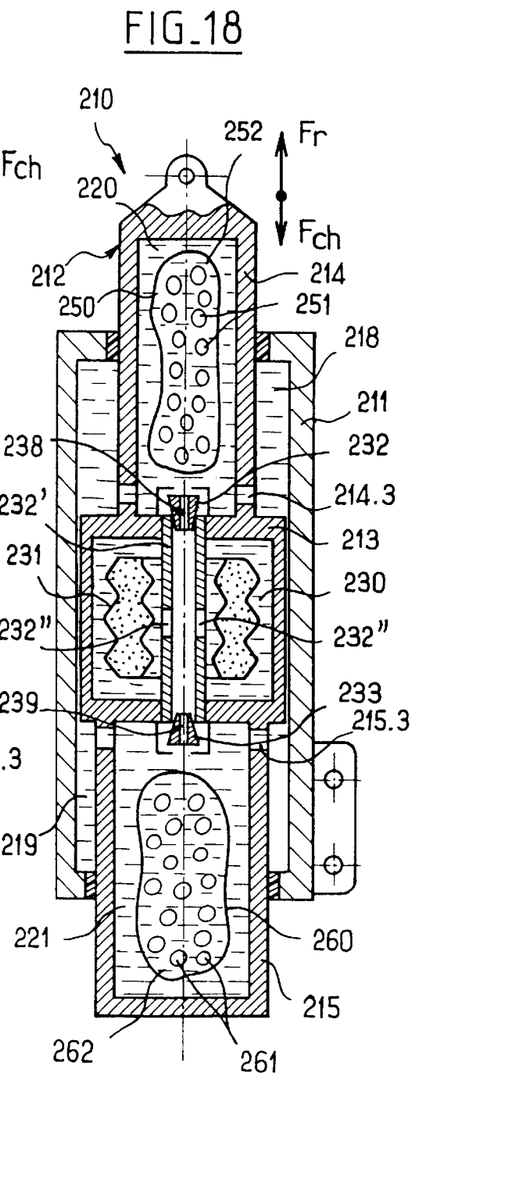

In FIG. 18, the references have been increased by a further 100. The difference compared with the variant of FIG. 17 lies in communication with the compensation chamber 230: a central tube 232' is used whose ends are suitable for being closed by means of floating valve members 232, 233 each having a calibrated central passage 238, 239 and opening out via middle orifices 232" into the chamber 230. The flexible envelope 231 which is in the compensation chamber 230 contains air as above, but it is now arranged in the form of a toroidal bellows surrounding the central tube 232'. As mentioned above, $F_r > F_{ch}$.

The solution of FIG. 18 is more advantageous than that of FIG. 17 when there is very little annular room available for receiving the check valves 132, 133 (FIG. 17) outside the portions 114, 115.

In FIGS. 19 to 23, the references are increased by a further 100. The rod-and-piston assembly 312 then has a rod which is solid on either side of the piston 313. The shock absorber 310 then has two chambers 320, 321 which are arranged around the cylinder 311, inside a common housing 370 (the variant of FIGS. 19 to 21). These two chambers 320, 321 are defined by radial webs 375 and each contains a heterogeneous structure 351, 352 and 361, 362 contained inside an associated flexible leakproof envelope 350, 360.

Figures 19, 20, 21:
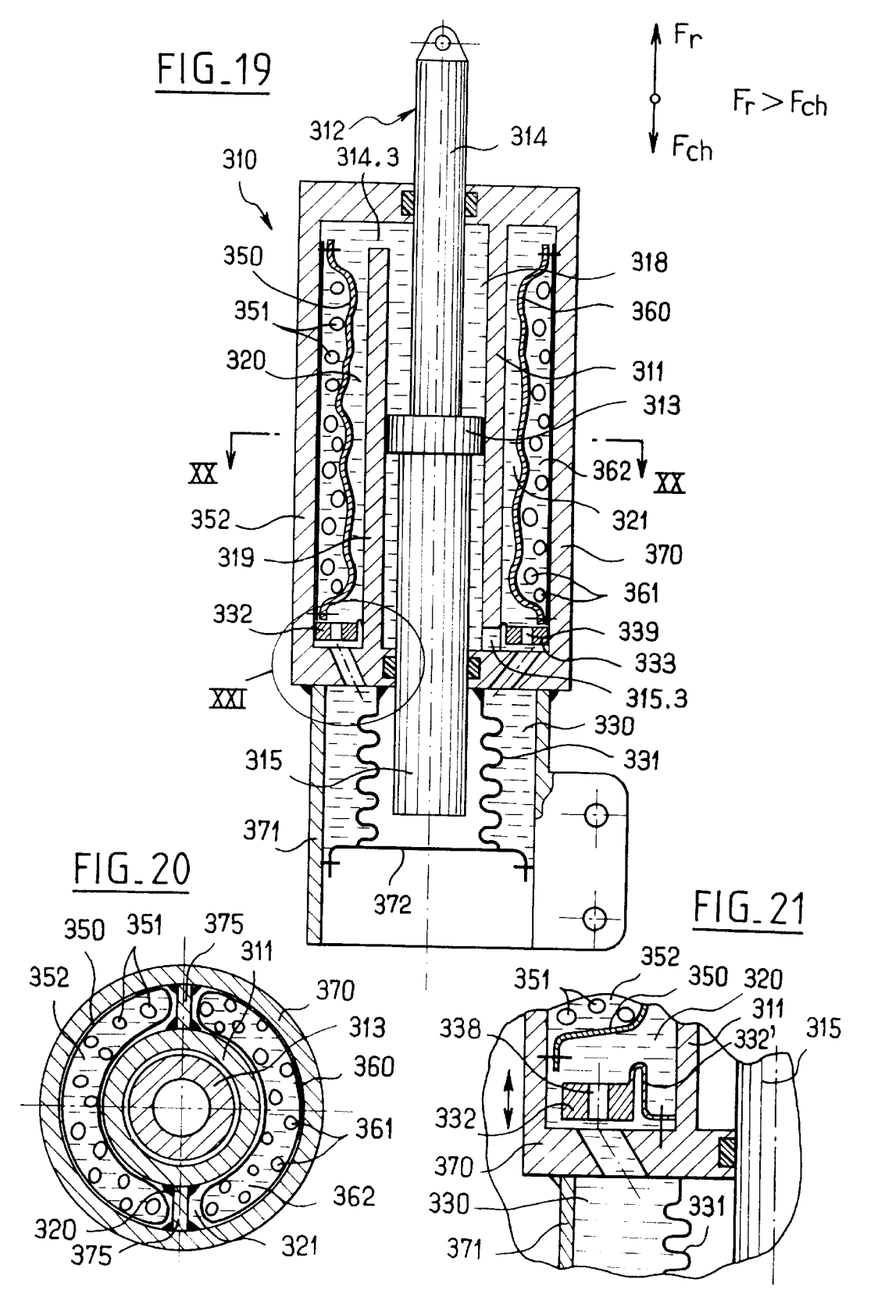
FIG. 19 is a section through yet another variant embodiment, with a rod-and-piston assembly whose rod is solid and with peripheral chambers receiving the heterogeneous energy absorption and dissipation structures.
FIG. 20 is a section on XX—XX of FIG. 19 showing the peripheral working chambers more clearly.
FIG. 21 is a fragmentary view showing detail XXI of FIG. 19 relating to the vicinity of a check valve, on a larger scale.

Each flexible leakproof envelope 350, 360 is then secured to the inside wall of the common housing 370.

The common compensation chamber 330 having a flexible wall 331 (metal or plastics bellows) is an annular chamber arranged in an extension 371 of the common housing 370, and is closed by a cover 372.

Communication with the compensation chamber 330 is provided by moving check valves 332, 333 biased by a spring 332' (only one can be seen in the detail of FIG. 21), each check valve having a central passage 338, 339 forming a calibrated orifice.

Again the relationship $F_r > F_{ch}$ applies (because the two segments of the solid rod are of different diameters).

Figure 22:
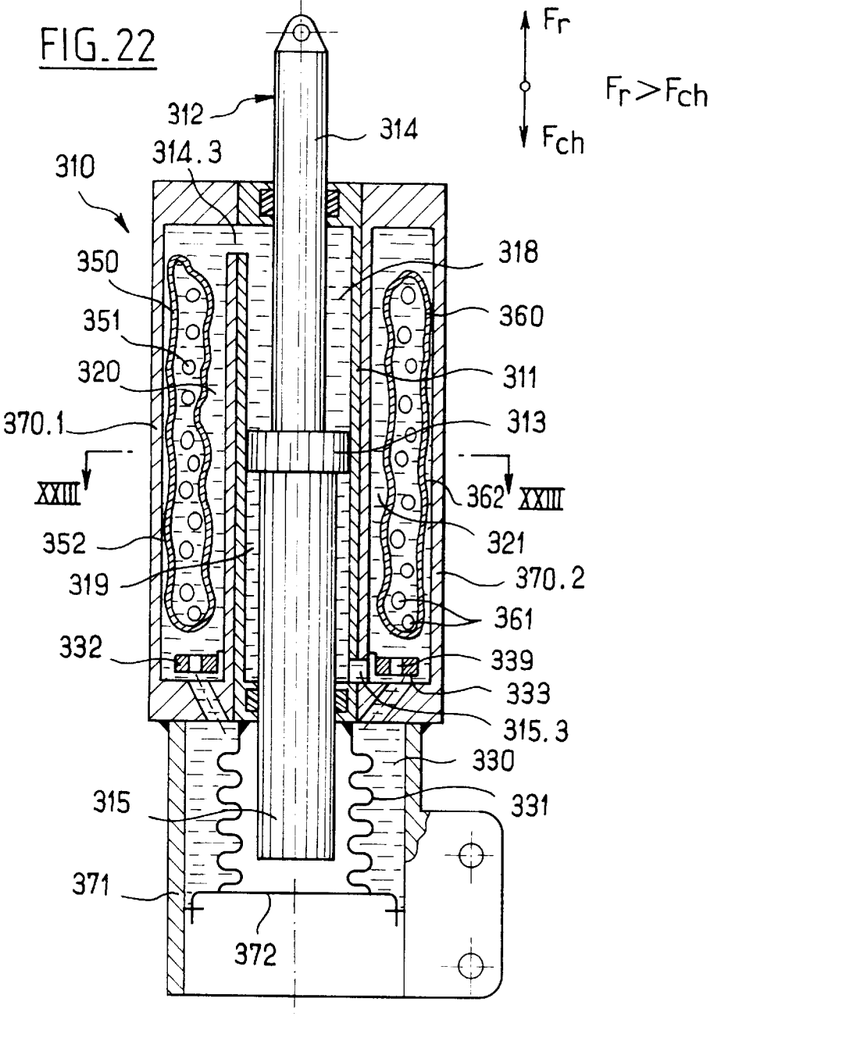
FIG. 22 is a section view through another variant derived from that of FIGS. 19 to 21 in which each flexible envelope is received in a lateral housing rigidly secured to the central housing which is associated with the rod-and-piston assembly.
Figure 23:
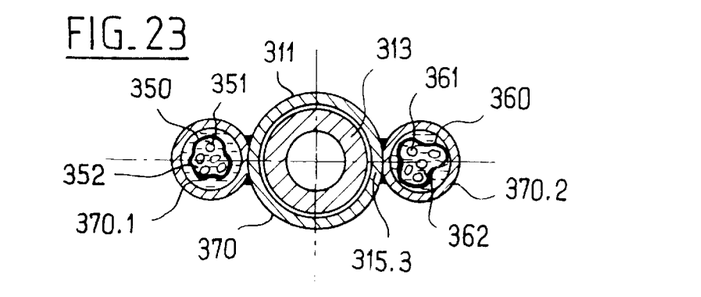
FIG. 23 is a section on XXIII—XXIII of FIG. 22 showing more clearly how the two lateral housings are arranged.

FIGS. 22 and 23 show a variant of the preceding embodiment as shown in FIGS. 19 to 21. This variant differs from the preceding variant in that the envelopes 350, 360 are housed in two lateral housings referenced 370.1, 370.2 which are rigidly secured to the central housing 370 associated with the rod-and-piston assembly 313. Communication between the lateral housings 370.1, 370.2 and the central housing 370 continues to be provided via common windows 314.3, 315.3 (shown in section in FIG. 23). The advantage of such an arrangement lies in structural implementation being simplified: it is easier to make the four external welds associated with the lateral housings 370.1, 370.2 than to make the eight internal welds associated with the radial webs 375 in the preceding variant. In addition, the envelopes 350 and 360 can be made in the form of elongate tubes, thus making them easier to manufacture and simpler to secure inside their respective chambers.

Finally, a shock absorber has been made in this manner having a very high degree of energy dissipation, i.e. of the order of 90% to 95%, whereas conventional shock absorbers can only reach values that generally lie in the range 30% to 40% under the best of circumstances.

In addition, it is shown above that the force applied to the rod-and-piston assembly of the shock absorber can remain independent of its displacement speed over certain speed ranges. This property which has never been obtained before with conventional shock absorbers can provide good comfort for the passengers of a vehicle. With the help of throttles, it is possible to ensure a linear relationship between force and speed over a low speed range. The procedure for adjusting the throttles to reach the speed zone concerned consists in varying the through section for the hydraulic fluid so that the maximum value of the hydraulic resistance of the throttle is equal to the capillary pressure that ensures the liquid can intrude into the pore space of the matrices in the heterogeneous structure that is placed in the flexible envelopes. In the range of speeds beyond a critical threshold, the force becomes dependent on displacement speed. The heterogeneous systems then act as filters for external disturbances providing excellent comfort for the passengers of the vehicle, and also diminishing the forces on said vehicle as a whole.

It is also possible to obtain a shock absorber which is 30% to 40% lighter than conventional shock absorbers and 30% to 40% more compact (1500 $cm^3$ for the volume of homogeneous fluid (oil) in the working chambers of a conventional shock absorber, to be compared with 12 $cm^3$ to 15 $cm^3$ for the volume of heterogeneous fluid in a shock absorber of the invention).

Finally, the shock absorber of the invention makes it possible to envisage operating over a frequency range going up to 30 Hz and beyond, whereas a conventional shock absorber generally becomes ineffective beyond 6 Hz.

The invention can be applied to a very wide variety of fields, and by way of non-limiting example, mention can be made of motor vehicles, rail vehicles, railway bumpers, aircraft landing gear, engine supports, various anti-vibration protection devices (including against soundwaves), anti-earthquake systems, and couplings between space modules.

The invention is not limited to the embodiment described above, but on the contrary covers any variant that uses equivalent means to reproduce the essential characteristics specified above.

What is claimed is:

1. A shock absorber having high dissipating power, of the type comprising a rod-and-piston assembly (2, 3) slidably received in a cylinder (4) and defining on either side of a piston (3) respective working chambers (5.1; 5.2) containing a hydraulic fluid, said rod-and-piston assembly being connected to an external source of disturbance (SP) and said cylinder being connected to a structure to be protected (S), wherein:

each working chamber (5.1; 5.2) communicates continuously with an associated chamber (6.1; 6.2) containing a heterogeneous energy absorption-dissipation structure constituted by at least one capillo-porous matrix (9) and an associated liquid (9') relative to which said matrix is lyophobic; and each working chamber (5.1; 5.2) also communicates with a common chamber (7) via an associated valve system (8.1; 8.2), said system including non-return means (8.11; 8.21) causing the working chamber concerned to close automatically during compression, and causing said chamber to open during expansion, said common chamber constituting a compensation chamber ensuring continuity of the hydraulic fluid during displacements of the rod-and-piston assembly (2, 3) in the cylinder (4).

2. A shock absorber according to claim 1, wherein the hydraulic fluid occupying the working chambers (5.1; 5.2) is identical to the liquid of the heterogeneous energy absorption-dissipation structures (9, 9').

3. A shock absorber according to claim 1, wherein each heterogeneous energy absorption-dissipation structure (9, 9') is confined in a deformable leakproof housing, the hydraulic fluid occupying the working chambers (5.1; 5.2) then being a conventional engineering fluid.

4. A shock absorber according to claim 1, wherein the rod-and-piston assembly (12; 112; 212) comprises a rod which is hollow on either side of the piston, each hollow portion defining internally a chamber containing a heterogeneous energy absorption-dissipation structure enclosed in a flexible leakproof envelope.

5. A shock absorber according to claim 1, wherein the rod-and-piston assembly (312) comprises a rod which is solid on either side of the piston, and said shock absorber has chambers containing respective heterogeneous-energy absorption-dissipation structures enclosed in flexible leakproof envelopes, which chambers are then placed around the cylinder, inside a common housing (370).

6. A shock absorber according to claim 4, wherein the rod-and-piston assembly (12) is constituted by two portions (14, 15) having the same outside diameter.

7. A shock absorber according to claim 4, wherein the rod-and-piston assembly (112; 212; 312) is constituted by two portions having different outside diameters, the portion with the larger diameter being adjacent to the structure to be protected, and the portion with the smaller diameter being adjacent to the external source of disturbance.

8. A shock absorber according to claim 4, wherein each flexible leakproof envelope (50; 60) is secured to an end wall (14.2; 15.2) of the associated internal chamber (20; 21) of the rod-and-piston assembly (12).

9. A shock absorber according to claim 5, wherein each flexible leakproof envelope (350, 360) is secured to the inside wall of the common housing (370).

10. A shock absorber according to claim 5, wherein each flexible leakproof envelope (350, 360) is freely suspended inside an associated lateral housing (370.1, 370.2) rigidly secured to the central housing (370) and in communication therewith via an associated window (314.3, 315.3).

11. A shock absorber according to claim 4, wherein each flexible leakproof envelope (150, 160; 250, 260) is freely suspended in the associated internal chamber of the rod-and-piston assembly.

12. A shock absorber according to claim 1, wherein the capillo-porous matrices (51, 61; 151, 161; 251, 261; 351, 361) are topologically-and geometrically identical on either side of the piston, each matrix being singly-porous or multiply-porous as a function of the stiffness desired of the shock absorber.

13. A shock absorber according to claim 1, wherein the capillo-porous matrices (51, 61; 151, 161; 251, 261; 351, 361) are topologically and geometrically different on opposite sides of the piston, each matrix being singly-porous or multiply-porous as a function of the stiffness desired for the shock absorber.

14. A shock absorber according to claim 1, wherein the lyophobic liquids (52, 62; 152, 162; 252, 262; 352, 362) have identical surface tension characteristics on either side of the piston.

15. A shock absorber according to claim 1, wherein the lyophobic liquids (52, 62; 152, 162; 252, 262; 352, 362) have different surface tension characteristics on either side of the piston.

16. A shock absorber according to claim 1, wherein the common compensation chamber (30; 130; 230; 330) has a flexible wall so as to present a volume that is variable.

17. A shock absorber according to claim 4, wherein the common compensation chamber (30; 130; 230; 330) has a flexible wall so as to present a volume that is variable, and wherein the flexible wall (31) surrounds a central portion of the cylinder (11) so as to define an annular chamber constituting the compensation chamber (30).

18. A shock absorber according to claim 4, wherein the common compensation chamber (30; 130; 230; 330) has a flexible wall so as to present a volume that is variable, and wherein the common compensation chamber (130; 230) having a flexible wall is arranged inside the piston which is designed to be hollow.

19. A shock absorber according to claim 4, wherein the common compensation chamber (30; 130; 230; 330) has a flexible wall so as to present a volume that is variable, and wherein the common compensation chamber (330) having a flexible wall is an annular chamber arranged at the end of the common housing (370).

20. A shock absorber according to claim 1, wherein the common compensation chamber (7) has a rigid wall, and presents an end wall (7', 7", 7''') that is movable or deformable and that is associated with a resilient member.

21. A shock absorber according to claim 1, wherein the valve system (32; 33) associated with each working chamber includes a throttle (34; 36) defining a calibrated orifice (38; 39) for passing hydraulic fluid coming from the common compensation chamber (30).

22. A shock absorber according to claim 21, wherein each throttle (34; 36) is individually adjustable, and in particular can be set to a position such that the maximum value of the hydraulic resistance of said throttle corresponds to the value of the capillary pressure at which the fluid (52; 62) intrudes into the pores of the associated matrix (51; 61).

23. A shock absorber according to claim 1, wherein the rod-and-piston assembly (12; 112; 212) comprises a rod which is hollow on either side of the piston, each hollow portion defining internally a chamber containing a heterogeneous energy absorption-dissipation structure enclosed in a flexible leakproof envelope, wherein the common compensation chamber (30; 130; 230; 330) has a flexible wall so as to present a volume that is variable, wherein the flexible wall (31) surrounds a central portion of the cylinder (11) so as to define an annular chamber constituting the compensation chamber (30), and wherein the non-return means of the valve system (32; 33) associated with each working chamber comprises a deformable flat collar (40; 41) with two branches capable of closing radial orifices (24; 25) of the cylinder (11) which communicate via respective channels (22; 23) with the common compensation chamber (30).

24. A shock absorber according to claim 1, wherein the rod-and-piston assembly (12; 112; 212) comprises a rod which is hollow on either side of the piston, each hollow portion defining internally a chamber containing a heterogeneous energy absorption-dissipation structure enclosed in a flexible leakproof envelope, wherein the common compensation chamber (30; 130; 230; 330) has a flexible wall so as to present a volume that is variable, wherein the common compensation chamber (130; 230) having a flexible wall is arranged inside the piston which is designed to be hollow, and wherein the non-return means of the valve system (132, 133; 232, 233; 332, 333) associated with each working chamber comprises moving valve members optionally biased by associated springs.

25. A shock absorber according to claim 24, wherein the moving valve members (232, 233) are arranged at the ends of a central tube (232') opening out into the hollow piston (213) via associated orifices (232"), the compensation chamber (230) containing a toroidal bellows containing air and surrounding said tube.

26. A shock absorber according to claim 24, wherein the moving valve members (132, 133; 232, 233; 332, 333) present respective central passages (138, 139; 238, 239; 338, 339) forming calibrated orifices.

* * * * *